United States Patent [19]
Orii

[11] 3,782,561
[45] Jan. 1, 1974

[54] WORKPIECE TRANSFER MEANS

[76] Inventor: Masaru Orii, 2102-1, Oaza Hegashi-Hango, Kawaguchi, Japan

[22] Filed: Sept. 11, 1972

[21] Appl. No.: 288,164

[52] U.S. Cl. ............................. 214/1 BB, 198/218
[51] Int. Cl. ........................................ B65g 25/04
[58] Field of Search................... 214/1 BB; 198/218

[56] References Cited
UNITED STATES PATENTS
3,295,701   1/1967   Alexander......................... 214/1 BB
FOREIGN PATENTS OR APPLICATIONS
2,014,447   10/1970   Germany.......................... 214/1 BB

*Primary Examiner*—Gerald M. Forlenza
*Assistant Examiner*—George F. Abraham
*Attorney*—Eric H. Waters et al.

[57] ABSTRACT

A workpiece transfer means having two parallel rods carrying clamping means secured thereto in pairs at positions such that the clamping means in each pair face each other, and means to cause swining motion of the rods towards and away from each other in symmetrical relation to each other. The transfer means may also include means to cause symmetrical vertical movement of the rods. The rods are also coupled together so that they can be moved reciprocally in horizontal axial direction. Hence the rods can undergo movement towards each other, advancement, movement away from each other and retraction for transferring a workpiece from one place to another. If vertical movement of the rods is additionally provided through operation of a vertical drive source, the rods can then be moved towards each other, raised, advanced, lowered, moved away from each other and then retracted for transferring a workpiece from one place to another.

10 Claims, 3 Drawing Figures

WORKPIECE TRANSFER MEANS

BACKGROUND OF THE INVENTION

1. Field of the Invention

This invention relates to workpiece transfer means for transferring workpieces to processing equipment such as a press or from such equipment to a further site.

2. Prior Art

Prior-art workpiece transfer means include devices which have parallel arm rods carrying clamping means secured thereto in pairs at positions such that each pair of clamping means face each other, the rods being capable of undergoing movement towards each other, axial advancement, movement away from each other and then retraction, whereby a workpiece can be clamped, transferred and placed at a desired location. In this type of prior-art workpiece transfer means, the rods can slide along guide rods for linear movement. Therefore, the guide rods must extend both in the direction of the axial movement of the arm rods and in the direction of movement of the arm rods towards and away from each other, so that the construction is complicated. Also, since the arm rods undergo sliding movement, great resistance is involved, and the movement itself is not sufficiently smooth. Further, when vertical movement of the arm rods is to be provided in addition to the axial movement and the approaching and separating movement of the arm rods, a mechanism for producing the vertical movement of the arm rods cannot be readily provided.

SUMMARY OF THE INVENTION

An object of the invention is to provide a workpiece transfer means, whose construction is simple, and which ensures smooth movement of the arm rods and in which the mechanism for causing vertical movement of the arm rods can be readily provided.

Another object of the invention is to provide a workpiece transfer means, with which not only will the axial movement and approaching and separating movement of the arm rods be achieved smoothly but also vertical movement thereof can be realized smoothly.

In accordance with the invention, each of the arm rods driven from an axial drive source for axial advancement or retraction is supported by one end of a lever for sliding movement in the axial direction relative to the associated lever, said levers being capable of pivotal or swinging movement about respective pivotal axes provided above or under the associated arm rods in a plane normal to the direction of axial movement of the arm rods, said levers being coupled through coupling means such that these levers can undergo simultaneous pivotal or swinging movement in symmetrical relation to each other, one of said levers being coupled to a drive source for pivotal movement of the levers so that the clamping means on the arm rods will clamp or release a workpiece. Thus, the construction can be simplified. Also, since the pivotal movement is subject to less resistance compared to the linear sliding movement in the known devices, it is possible to ensure smooth movement of the arm rods. Further, the vertical movement of the arm rods may be obtained by effecting vertical displacement of the axes of pivotal motion of the levers. Thus, it is possible to readily provide a mechanism for causing vertical movement of the arm rods.

According to a further feature of the invention, the levers are pivoted to one end of respective coupling levers whose other ends are mounted on respective support rods secured to a housing such that one end of said respective coupling levers is capable of vertical reciprocal revolution about the associated support rod, said coupling levers being coupled together such that they undergo simultaneous pivotal or swinging movement in symmetrical relation to each other. A vertical drive source for causing the vertical movement of said coupling levers is coupled to one of said two coupling levers. In this way, it is possible to ensure smooth vertical movement of the arm rods, which is also derived from a pivotal movement.

DETAILED DESCRIPTION OF THE PREFERRED EMBODIMENT

Figure 1:
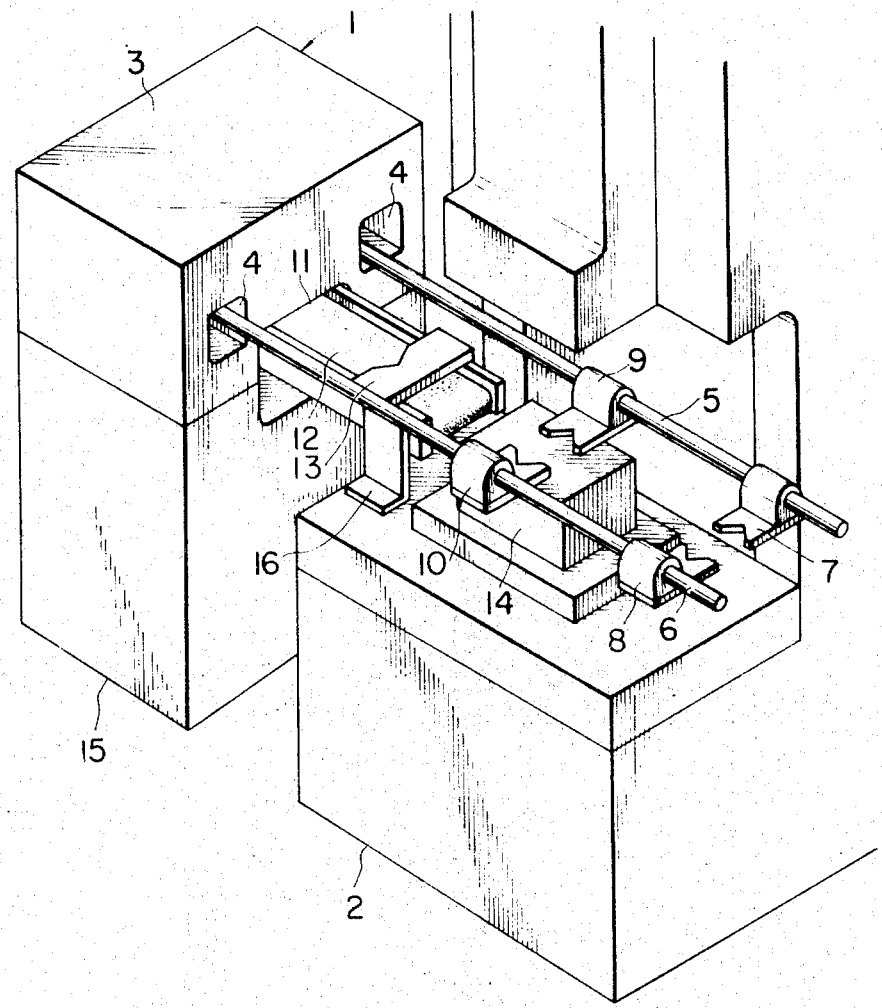
FIG. 1 is a perspective view showing a processing machine provided with an embodiment of the workpiece transfer means according to the invention.

Referring first to FIG. 1, there is shown a processing machine 2 provided with a workpiece transfer means 1 according to the invention. The workpiece transfer means has a box-like frame 3 provided with windows 4, through which extend two parallel arm rods 5 and 6. Clamping means 7, 8, 9 and 10 for clamping workpieces are secured to the arm rods 5 and 6 at positions such that the clamping means 7 and 8 face each other and the clamping means 9 and 10 face each other. The bottom of the box-like frame 3 is provided with a workpiece passage 11, in which a belt conveyor 12 is mounted. The frame of the conveyor 12 is provided with a stopper 13, against which a workpiece transferred by the conveyor 12 from within the box-like frame 3 engages. The arm rods 5 and 6 are supported in frame 3 in a manner to be explained more fully hereafter such that the rods are reciprocally movable both vertically and horizontally in the windows 4 and also movable towards and away from one another. Hence, a workpiece held in position by the stopper 13 can be clamped between the clamping means 9 and 10, whereafter the arm rods 5 and 6 can be raised, advanced and then lowered, whereby the workpiece is transferred to and placed on a process machine table 14. After the workpiece has been processed by the processing machine 2, for instance a press, it is clamped between the clamping means 7 and 8 by first moving the rod arms away from one another to clear the workpiece and then bringing them closer to each other. The workpiece is transferred from the table 14 to another site as the rods 5 and 6 carrying the workpiece there-between are raised, advanced, lowered and moved away from each other. Reference numerals 15 and 16 designate supports to which the frame of the conveyor 12 is secured.

Figure 2:
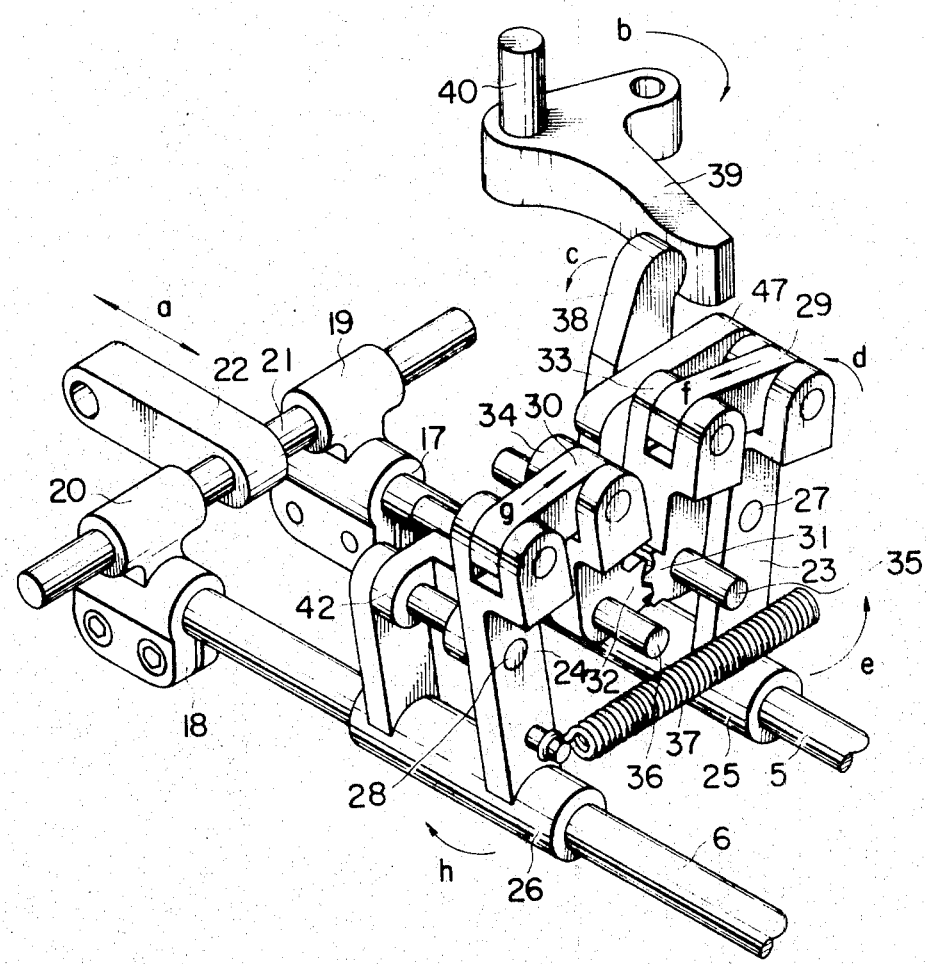
FIG. 2 is a perspective view showing the inner construction of the embodiment of the invention.
Figure 3:
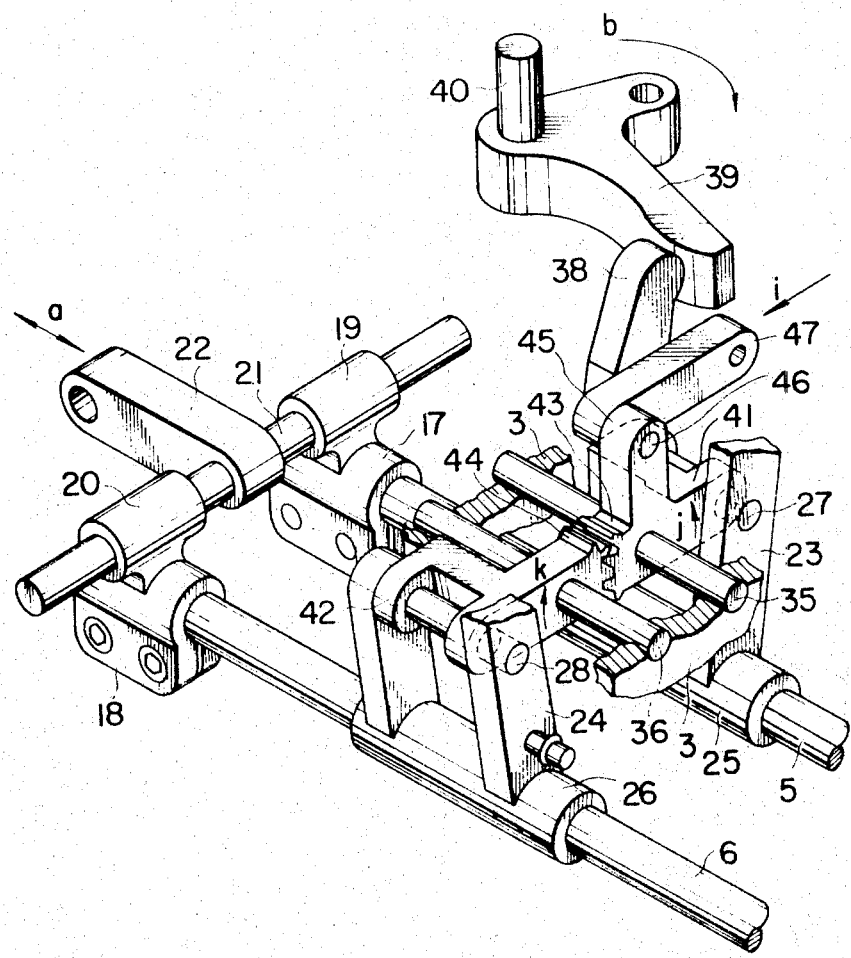
FIG. 3 is a perspective view chiefly showing a mechanism for causing vertical movement of the arm rods embodying the invention.

FIGS. 2 and 3 show the operating mechanisms within the box-like frame 3 for the arm rods 5 and 6. FIG. 2 chiefly shows the mechanism for moving the arm rods towards or away from each other, while FIG. 3 chiefly shows the mechanism for moving the arm rods vertically. The ends of the arm rods 5 and 6 are secured to respective brackets 17 and 18, which are provided with respective upper bearings 19 and 20, in which a horizontal rod 21 is in turn slidably mounted. Mounted on the horizontal rod 21 is an axial drive link 22, which can be reciprocally driven in the direction of arrow $a$ from a drive source (not shown) for advancement or retraction of the arm rods 5 and 6.

The mechanism for moving the arm rods towards or away from each other will now be described with reference to FIG. 2. The arm rods 5 and 6 are received in respective arm rod holder portions 25 and 26 formed at the lower end of respective levers 23 and 24. The arm rods 5 and 6 are capable of axial movement and rotation relative to their holders 25 and 26. The levers 23 and 24 are capable of pivotal movement about respective rods 27 and 28, which extend above the respective arm rods 5 and 6. The rods 27 and 28 are vertically movable in a manner to be explained more fully later in connection with FIG. 3. The levers 23 and 24 are also coupled together through a coupling means, which comprises links 29 and 30 pivotally connected to the respective levers 23 and 24 and to coupling members 33 and 34, the latter being provided with respective gear portions 31 and 32 in mesh with each other. The coupling members 33 and 34 are mounted on and capable of rotation about respective support rods or axes 35 and 36 secured to frame 3. The lever 24 is biased with a tension spring 37 tending to pull it towards the lever 23. The lever 23 has an integral pressure bearing portion 38 in contact with an operating lever 39, which is coupled to a drive source (not shown) such that it can be rotated about its support rod 40 for moving the arm rods towards each other or away from each other.

In operation, when a controlled drive force is applied to the operating lever 39 to rotate it in the direction of arrow $b$, it pushes the pressure bearing portion 38 in the direction of arrow $c$, thus causing rotation of the lever 23 about the vertically movable rod 27 in the direction of arrow $d$, so that the arm rod holder 25 and arm rod 5 are moved in the direction of arrow $e$. With the rotation of the lever 23 in the direction of arrow $d$, the link 29 is displaced in the direction of arrow $f$ to cause rotation of the coupling member 33 about its support rod 35. The rotation of the coupling member 33 is transmitted through the gears 31 and 32 to the other coupling member 34 to cause displacement of the link 30 in the direction of arrow $g$, thus causing rotation of the lever 24 about the vertically movable rod 28 in a direction opposite to the direction of rotation of the lever 23, so that the arm rod holder 26 and arm rod 6 are moved in the direction of arrow $h$.

When the operating lever 39 is rotated in the direction opposite to the direction of arrow $b$, the levers 23 and 24 are rotated in the directions opposite to the above directions to cause rotation of the arm rod holders 25 and 26 and arm rods 5 and 6 in respective directions opposite to the afore-mentioned directions. By periodically repeating the above operation, the levers 23 and 24 execute periodical pivotal movement in a symmetrical relation to each other, repeatedly causing the clamping action and releasing action of the arm rods 5 and 6.

The mechanism for producing vertical movement of the arm rods will now be described with reference to FIG. 3. Support rods 35, 36 carry respective coupling levers 41 and 42 rotatably thereon. The coupling levers 41 and 42 have respective gear portions 43 and 44 in mesh with each other and their ends opposite the gear portions carry the vertically movable rods 27 and 28 respectively. The coupling lever 41 is provided with a projection 45 connected by a pin 46 to an operating link 47.

When a controlled drive force is exerted on the operating line 47 to move it in the direction of arrow $i$, it causes rotation of the coupling lever 41 about the support rod 35 in the direction of arrow $j$ to raise the vertically movable rod 27. By raising the vertically movable rod 27, the lever 23, arm rod holder 25 and arm rod 5 are also raised. The rotation of the coupling lever 41 is transmitted through the gears 43 and 44 to the other coupling lever 42 to cause the rotation of the coupling lever 42 in the direction of arrow $k$, thus causing raising of the vertically movable rod 28 to raise the lever 24, arm rod holder 26 and arm rod 6.

When the operating link 47 is moved in the direction opposite to the direction of arrow $i$, the coupling levers 41 and 42 are rotated in directions opposite to the afore-mentioned directions, thus causing the lowering of the vertically movable rods 27 and 28 to lower the levers 23 and 24 and arm rods 5 and 6. By periodically repeating the above operation, the coupling levers 41 and 42 execute periodical rotational movement in a symmetrical relation to each other, repeatedly causing the vertical reciprocation of the arm rods 5 and 6.

In the illustrated embodiment, since the arm rods 5 and 6 themselves can be vertically moved, a conventional means to cause vertical movement of the clamping means can be dispensed with. Also, the manufacture of the clamping members 7, 8, 9, and 10 can be simplified, and the positional precision improved.

What is claimed is:

1. A workpiece transfer means comprising two parallel rods, clamping means secured in pairs to said rods at positions such that the clamping means in each pair face each other, means coupled to said rods for conjointly moving the rods horizontally and for moving the same towards and away from each other for transferring a workpiece from one place to another, the latter said means including a first drive member coupled to said rods for horizontally moving the same conjointly, a pair of levers each having an end supporting a respective rod therein for axial slidable movement, means supporting said levers for pivotal movement about respective axes spaced from the associated rods and including coupling means coupled to said levers for producing pivotal movement of said levers about said axes in symmetrical relation to each other to cause said rods to move towards or away from each other, and drive means coupled to one of said levers for applying a force thereto to produce said pivotal movement of said levers.

2. A workpiece transfer means as claimed in claim 1 wherein said coupling means comprises a pair of links each pivotably connected to an associated lever, and a pair of coupling members each pivoted to an associated one of said links and supported for pivotable movement about a respective one of said axes, said coupling members including respective gear portions meshing with each other to cause symmetrical movement of said levers when the drive means is operated.

3. A workpiece transfer means as claimed in claim 2 comprising resilient means acting on one of said levers to urge the same towards the other of the levers and maintain the gear portions in mesh with one another.

4. A workpiece transfer means as claimed in claim 2 wherein said means supporting said levers for pivotal movement comprises a pair of fixed parallel axles pivotably supporting a respective coupling member.

5. A workpiece transfer means as claimed in claim 1 comprising means pivotably connected to said levers for raising and lowering said levers conjointly and the rods therewith.

6. A workpiece transfer means as claimed in claim 5 wherein said means for raising and lowering said levers comprises a pair of coupling levers each pivotably connected to a respective one of the levers supporting the rods and in turn coupled to one another and respectively supported for pivotal movement about said axes to undergo simultaneous pivotal movement in symmetrical relation and produce symmetrical vertical movement of the rods, and second drive means coupled to one of said coupling levers for applying force thereto to raise or lower said rods.

7. A workpiece transfer means as claimed in claim 6 wherein said coupling levers include respective gear portions meshing with each other.

8. A workpiece transfer means as claimed in claim 6 wherein said means supporting said levers carrying the rods for pivotal movement comprises a pair of fixed parallel axles pivotably supporting a respective coupling member and a respective coupling lever.

9. A workpiece transfer means as claimed in claim 8 wherein said rods and axles are parallel to one another.

10. A workpiece transfer means as claimed in claim 1 wherein the means for conjointly moving the rods horizontally comprises brackets secured to said rods, a horizontal shaft slidably mounted in said brackets and extending transversely of the rods, and a drive link pivotably mounted on said shaft for application of horizontal force thereto to conjointly move said rods axially.

* * * * *